(12) United States Patent
Panamarathupalayam et al.

(10) Patent No.: US 10,337,289 B2
(45) Date of Patent: Jul. 2, 2019

(54) HIGH TEMPERATURE VISCOSIFIER FOR INSULATING PACKER FLUIDS

(71) Applicant: M-I L.L.C., Houston, TX (US)

(72) Inventors: Balakrishnan Panamarathupalayam, Houston, TX (US); Changping Sui, The Woodlands, TX (US); Hui Joyce Zhang, Sugar Land, TX (US); William E. Foxenberg, Pearland, TX (US)

(73) Assignee: M-I L.L.C., Houston, TX (US)

( * ) Notice: Subject to any disclaimer, the term of this patent is extended or adjusted under 35 U.S.C. 154(b) by 578 days.

(21) Appl. No.: 14/648,553

(22) PCT Filed: Nov. 25, 2013

(86) PCT No.: PCT/US2013/071655
§ 371 (c)(1),
(2) Date: May 29, 2015

(87) PCT Pub. No.: WO2014/085317
PCT Pub. Date: Jun. 5, 2014

(65) Prior Publication Data
US 2015/0322744 A1   Nov. 12, 2015

Related U.S. Application Data

(60) Provisional application No. 61/731,144, filed on Nov. 29, 2012.

(51) Int. Cl.
*E21B 36/00* (2006.01)
*E21B 43/24* (2006.01)
(Continued)

(52) U.S. Cl.
CPC ............ *E21B 36/003* (2013.01); *C04B 26/04* (2013.01); *C09K 8/34* (2013.01); *C09K 8/42* (2013.01);
(Continued)

(58) Field of Classification Search
CPC ........ E21B 36/003; E21B 43/24; C04B 26/04; C09K 8/502; C09K 8/50; C09K 8/32; C09K 8/34; C09K 8/42; C09K 8/44; C09K 8/82
See application file for complete search history.

(56) References Cited

U.S. PATENT DOCUMENTS 4,716,183 A * 12/1987 Gamarra ............... C08L 53/025
522/80
6,017,854 A *  1/2000 Van Slyke ............. C09K 8/32
507/103
(Continued)

FOREIGN PATENT DOCUMENTS

JP         7096637 B2    10/1995
WO       2006/056774 A2    6/2006
WO    WO-2006056774 A2 *   6/2006  ............... C09K 8/36

OTHER PUBLICATIONS

International Search Report and Written Opinion for the equivalent International patent application PCT/US2013/071655 dated Mar. 5, 2014.

(Continued)

*Primary Examiner* — Daniel P Stephenson
(74) *Attorney, Agent, or Firm* — David J. Smith

(57) ABSTRACT

An insulating packer fluid including an oleaginous fluid and a styrenic thermoplastic block copolymer and methods of preparing the packer fluid are provided. Also provided are methods of using the insulating packer fluid that include pumping an insulating packer fluid into an annulus formed between two concentric strings of pipe extending into a wellbore.

21 Claims, 1 Drawing Sheet

(51) Int. Cl.
- *C09K 8/82* (2006.01)
- *C09K 8/42* (2006.01)
- *C09K 8/50* (2006.01)
- *C09K 8/34* (2006.01)
- *C09K 8/502* (2006.01)
- *C04B 26/04* (2006.01)
- *C09K 8/44* (2006.01)

(52) U.S. Cl.
CPC ............... *C09K 8/44* (2013.01); *C09K 8/50* (2013.01); *C09K 8/502* (2013.01); *C09K 8/82* (2013.01); *E21B 43/24* (2013.01)

(56) References Cited

U.S. PATENT DOCUMENTS

| | | | | |
|---|---|---|---|---|
| 6,914,091 B2* | 7/2005 | Donald | C08F 8/04 | 524/156 |
| 7,565,933 B2* | 7/2009 | Kippie | C09K 8/58 | 166/309 |
| 7,863,223 B2* | 1/2011 | Leggett | C09K 8/502 | 166/308.4 |
| 8,236,736 B2* | 8/2012 | Leggett | C09K 8/502 | 166/302 |
| 8,728,989 B2* | 5/2014 | Kakadjian, Sr. | C09K 8/035 | 507/221 |
| 2006/0009364 A1* | 1/2006 | Dobson, Jr. | C09K 8/32 | 507/110 |
| 2010/0224366 A1* | 9/2010 | Lende | C04B 28/02 | 166/292 |
| 2015/0299558 A1* | 10/2015 | Sui | C09K 8/592 | 166/302 |
| 2015/0322744 A1* | 11/2015 | Panamarathupalayam | C09K 8/42 | 166/303 |
| 2016/0362593 A1* | 12/2016 | Bening | C08G 81/02 | |
| 2018/0134939 A1* | 5/2018 | Gupta | C09K 8/03 | |

OTHER PUBLICATIONS

International Preliminary Report on Patentability for the equivalent International patent application PCT/US2013/071655 dated Jun. 11, 2015.

* cited by examiner

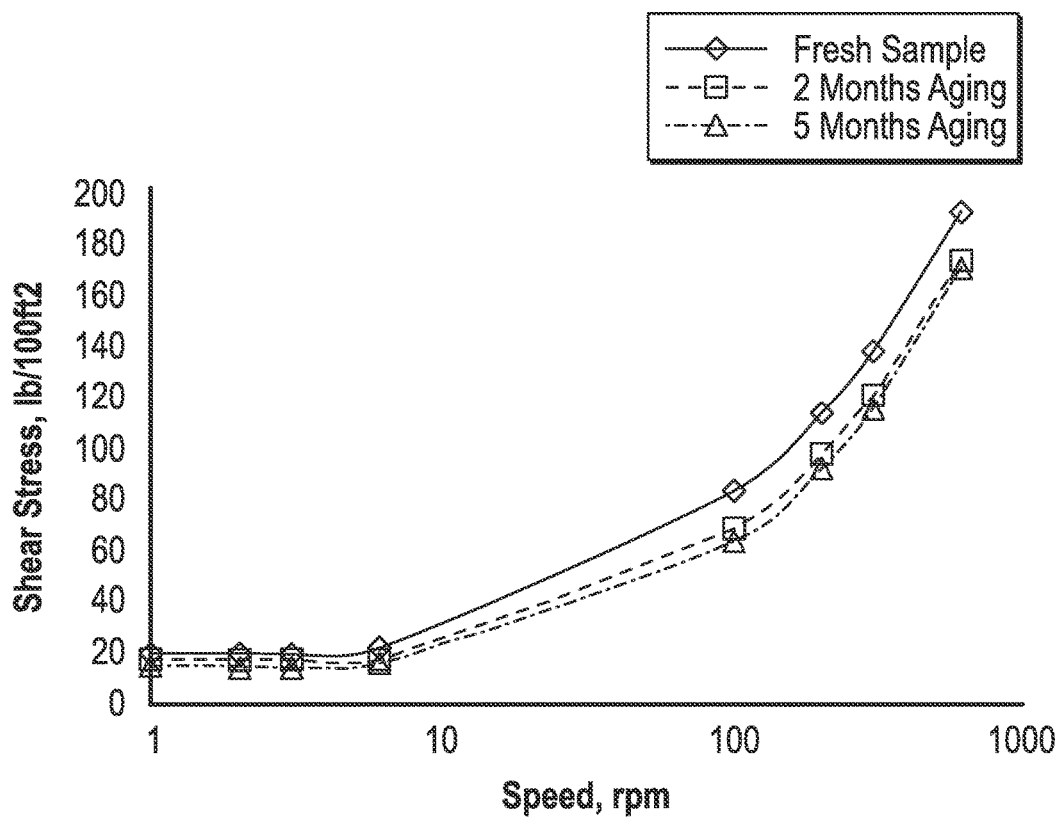

HIGH TEMPERATURE VISCOSIFIER FOR INSULATING PACKER FLUIDS

BACKGROUND

Annular fluids or packer fluids are liquids which are pumped into annular openings such as, for example, (1) between a wellbore wall and one or more casing strings of pipe extending into a wellbore, or (2) between adjacent, concentric strings of pipe extending into a wellbore, or (3) in one or both of an A- or B-annulus in a wellbore comprising at least an A- and B-annulus with one or more inner strings of pipe extending into a said wellbore, which may be running in parallel or nominally in parallel with each other and may or may not be concentric or nominally concentric with the outer casing string, or (4) in one or more of an A-, B- or C-annulus in a wellbore comprising at least an A-, B- and C-annulus with one or more inner strings of pipe extending into a said wellbore, which may be running in parallel or nominally in parallel with each other and may or may not be concentric or nominally concentric with the outer casing string.

Yet alternatively, said one or more strings of pipe may simply run through a conduit or outer pipe(s) to connect one or more wellbores to another wellbore or to lead from one or more wellbores to a centralized gathering or processing center; and said annular fluid may have been emplaced within said conduit or pipe(s) but external to said one or more strings of pipe therein. Insulating annular fluids or insulating packer fluids are annular fluids or packer fluids used to control heat loss—both conductive and convective heat losses.

Further, conditions where the drill string are in contact with large bodies of water, such as deepwater operations, may also require thermal isolation of production fluids from the surrounding environment. Deepwater drilling is carried out under high bottom hole temperatures and pressures. The deepwater wells stretch to several thousand meters in depth, where the majority of the well string is in direct contact with ocean waters. Contact of the surrounding waters with the drill string may result in the rapid transfer of heat, leading to the formation of gas hydrates as described above.

Heavy oil production is another operation which often can benefit from the use of an insulating annular fluid. In heavy oil production, a high-pressure steam or hot water is injected into the well and the oil reservoir to heat the fluids in the reservoir, causing a thermal expansion of the crude oil, an increase in reservoir pressure and a decrease of the oil's viscosity. In this process, damage to the well casing may occur when heat is transferred through the annulus between the well tubing and the casing. The resulting thermal expansion of the casing can break the bond between the casing and the surrounding cement, causing leakage. Accordingly, an insulating medium such as a packer fluid may be used to insulate or to help insulate the well tubing. The packer fluid may also reduce heat loss and save on energy requirements in stimulation using hot-water or steam (huff-n-puff) or in hot-water or steam-flooding.

In addition to steam injection processes and operations which occur as production through a permafrost layer or subsea fields such as in deep water (e.g., 1,500 to more than 6,000 feet), specially designed systems may require an insulating annular or packer fluid. For example, a subsea oil reservoir temperature may be from about 120° F. and 250° F., while the temperature of the water through which the oil may be conveyed is often as low as 32° F. to 50° F. Conveying the high temperature oil through such a low temperature environment can result in oil temperature reduction and consequently the separation of the oils into various hydrocarbon fractions and the deposition of paraffins, waxes, asphaltenes, and gas hydrates. The agglomeration of these oil constituents can cause blocking or restriction of the wellbore, resulting in reduction or even failure of the production operation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an insulating packer fluid that includes an oleaginous fluid and a styrenic thermoplastic block copolymer.

In another aspect, embodiments disclosed herein relate to a method that includes pumping an insulating packer fluid into an annulus extending into a wellbore, the insulating packer fluid including an oleaginous fluid and a styrenic thermoplastic block copolymer. The method may further include holding the insulating packer fluid static in the annulus between a first interior temperature and a second exterior temperature.

In yet another aspect, embodiments disclosed herein relate to a method for preparing a packer fluid that includes adding a styrenic thermoplastic block copolymer to an oleaginous fluid and shearing the combined oleaginous fluid and styrenic thermoplastic block copolymer.

In yet another aspect, embodiments disclosed herein relate to methods for stimulating a well, including preparing a packer fluid including an oleaginous fluid and a styrenic thermoplastic block copolymer. The method may also include pumping the packer fluid into an annular region of a wellbore created by two concentric strings of pipe extending into the wellbore and injecting hot water or steam through a pipe extending through the annular region containing the packer fluid.

Other aspects and advantages of the present disclosure will be apparent from the following description and the appended claims.

BRIEF DESCRIPTION OF DRAWINGS

FIG. 1 depicts a graph showing rheology data for fluids and compositions disclosed herein.

DETAILED DESCRIPTION

Embodiments of the present disclosure relate to insulating packer fluids and methods of preparing and emplacing such fluids. Packer fluids according to the present disclosure have good long-term insulation properties, because they resist syneresis and separation of various components into separate phases, and have low thermal conductivities and unique rheological properties that minimize their movement once they are emplaced—and this minimization of movement, in turn, minimizes convective heat loss.

A majority of annular heat loss is due to convection and conduction. Heat loss due to thermal conductivity may be controlled by proper selection of fluids, i.e. fluids with low thermal conductivities, while heat loss due to convection can be arrested or substantially diminished by increasing the viscosity of the selected fluid. Thus, the use of an oleaginous fluid may allow for the use of a fluid having low thermal conductivity.

"Oleaginous liquid," as used herein, means an oil which is a liquid at 25° C. and is immiscible with water. Oleaginous liquids may include substances such as hydrocarbons used in the formulation of drilling fluids such as diesel oil, mineral oil, synthetic oil (including linear alpha olefins and internal olefins), ester oils, glycerides of fatty acids, aliphatic esters, aliphatic ethers, aliphatic acetals, or other such hydrocarbons and combinations of these fluids.

In certain aspects, disclosed embodiments relate to insulating copolymer-containing packer fluids, and methods of emplacing and subsequently removing such fluids. Packer fluids according to embodiments disclosed herein may have relatively high densities, and may be adapted to survive in high temperature and/or high pressure wells. More specifically, insulating packer fluids in accordance with disclosed embodiments are oil-based (hydrocarbon-based) fluids, which may include copolymers, and optionally, one or more of particulates (such as precipitated silicas, organophilic clays, inorganic weighting agents) and other organic polymers such as alkyl diamides (such as those disclosed in U.S. Pat. No. 8,236,736) or oil soluble polymers (such as those sold under the trade name ECOTROL by MI SWACO (Houston, Tex.)) may possess low thermal conductivities, increased viscosity, and high stability under elevated temperatures. While the disclosure has been described with respect to a limited number of embodiments, those skilled in the art, having benefit of this disclosure, will appreciate that other embodiments can be devised which do not depart from the scope of the present application as disclosed herein. Accordingly, the scope of the present disclosure should be limited only by the attached claims.

Styrenic Thermoplastic Block Copolymer

Thermoplastic elastomers are a novel class of polymers that can combine the dual characteristics of elastomers and thermoplastics. In general, it has been found that thermoplastic elastomers have a thermal degradation resistance that is related to the amount of allylic hydrogens. For example, as monomer units become more saturated, it would be expected that the thermal stability should increase. Contrary to the expectation, the thermal stability of these thermoplastic elastomers decreases with increased saturation in the presence of air in temperatures below 480 C.

The copolymer may be in various forms, such as a diblock or triblock polymer. Further, in some embodiments, the thermoplastic elastomer may be linear, branched, star or even dendritic in structure. Comonomers may include at least one of ethylene, propylene, butylene, butadiene, or isoprene. In one or more particular embodiments, an ethylene/propylene or an ethylene/butylene block segment may be used in conjunction with the styrenic block segment. Further, it is also within the scope of the present disclosure that a tri-block polymer be used, such as a styrene-ethylene/propylene-styrene block copolymer or a styrene-ethylene/butylene-styrene block copolymer. Further, it is also within the scope of the present disclosure that one or more diene segments may be used (i.e., styrene-butadiene or styrene-butadiene-styrene), and in such embodiments, it is also within the scope of the present disclosure that the copolymer may optionally be at least partially hydrogenated.

In some embodiments, the ratio of styrene to its comonomer(s) in the thermoplastic elastomer is at least 20:80. In other embodiments, the percentage of styrene block segments is at least 25%, 30%, 35% or 40% and no more than 40%, 45%, 50%, 60%, 70%, and 80% (where any lower limit can be used with any upper limit), with the balance being the other comonomer block segments.

It will be appreciated that the arrangement of the block segments, the relative amounts of the block segments (with respect to one another), the molecular weight or length of the block segments (as well as the total molecular weight and molecular weight distribution) may affect the physical properties of the resulting copolymer, and the amount and/or placement that may be desirable for a particular wellbore application. For example, the amount of the block copolymer used in the wellbore fluids of the present disclosure may broadly range from 0.5-10 percent by weight of the fluidic portion of the fluid, and may have a lower limit of any of 0.5, 1, 2, 3, 4, or 5 weight percent, and an upper limit of any of 4, 5, 6, 7, 8, 9, or 10 weight percent, where any lower limit can be used with any upper limit. Further, the particular copolymer may have a unique Tau zero ($\tau_0$), or yield stress at zero shear rate, affected by the same considerations mentioned above. In one or more embodiments, the fluid may have a Tau zero of greater than 10 at room temperature as well as at temperatures expected to be encountered in the well. However, because Tau zero may be temperature dependent, fluids having a lower Tau zero at some temperatures, but a Tau zero of at least about 10 at other temperatures may still be useful in wells that will have the temperature ranges falling within the higher Tau zero range.

One issue in formulating annular fluids is that oil phase separation can occur. This phenomenon is known as "top oil loss" or "top oil separation", and can be combated through the use of the disclosed copolymers. Specifically, by mixing the copolymers in with the base fluid, the oil, which would otherwise phase separate, can be gelled, preventing this phenomenon.

Solid Particulate Phase

It is also intended that one or more solid particulates may be incorporated into the fluid to provide density, viscosification, and/or prevention of top oil separation. Such particulates may include silica, inorganic weighting agents, clay particles, and the other organic viscosifiers such as alkyl diamides or oil soluble polymers.

Solid inorganic weighting agents used in some embodiments disclosed herein may include a variety of inorganic compounds well known to one of skill in the art. In some embodiments, the weighting agent may be selected from one or more of the materials including, for example, barium sulfate (barite), calcium carbonate (calcite or aragonite), dolomite, ilmenite, hematite or other iron ores, olivine, siderite, manganese oxide, and strontium sulphate. In a particular embodiment, calcium carbonate or another acid soluble solid weighting agent may be used.

For example, fumed or pyrogenic silicas useful in embodiments disclosed herein are produced from the vapor phase hydrolysis of chlorosilanes, such as silicon tetrachloride, in a hydrogen oxygen flame are non-porous, water-soluble, have low bulk density, and possess high surface area. Due to the hydrogen bonding of the surface silanol groups present on the silica particles, fumed silicas may also impart unique rheological properties, such as increased viscosity and shear-thinning behavior, when added to aqueous and emulsion fluid systems.

Another form of silica useful in embodiments of the present disclosure as a viscosifying and/or weighting agent are precipitated silicas, such as those prepared from the reaction of an alkaline silicate solution with a mineral acid. Precipitated silicas may have a porous structure, and may behave as a porous structure prepared from the reaction of an alkaline silicate solution with a mineral acid. Alkaline silicates may be selected, for example, from one or more of sodium silicate, potassium silicate, lithium silicate and quaternary ammonium silicates. Precipitated silicas may be produced by the destabilization and precipitation of silica from soluble silicates by the addition of a mineral acid and/or acidic gases. The reactants thus include an alkali metal silicate and a mineral acid, such as sulfuric acid, or an acidulating agent, such as carbon dioxide. Precipitation may be carried out under alkaline conditions, for example, by the addition of a mineral acid and an alkaline silicate solution to water with constant agitation. The properties of the silica particles may also be dependent, for example, on the choice of agitation, duration of precipitation, the addition rate of reactants, temperature, concentration, and pH.

Silicas useful in embodiments herein may include finely-divided particulate solid materials, such as powders, silts, or sands, as well as reinforced flocs or agglomerates of smaller particles of siliceous material. In one or more embodiments, silica particles (or agglomerates thereof) may have an average particle size ($d_{50}$) with a lower limit equal to or greater than 0.25 µm, 0.5 µm, 1 µm, 2 µm, 5 µm, 6 µm, and 8 µm to an upper limit of 5 µm, 10 µm, 15 µm, 20 µm, 40 µm, and 50 µm, where the $d_{50}$ of the silica particles may range from any lower limit to any upper limit. In some embodiments, silicas having a larger initial average particle size may be used, where shear or other conditions may result in comminution, i.e., reduction of size, of the particles, such as breaking up of agglomerates, resulting in a silica particle having a useful average particle size. In yet other embodiments of the present disclosure, it is envisioned that mixtures of varying sizes of silicas may be added to various wellbore fluids.

Depending on the desired effect of the solid particulates, they may be used in an amount up to 10 weight percent of the fluid, and in one or more embodiments, may be used in an amount greater than 1, 2, 3, 5, 7, or 8 weight percent.

Wellbore Fluid Formulation

The styrenic copolymer and optional silicas, weighting agents, etc. as described above may be combined to form an oleaginous fluid (oil-based) wellbore fluid, as outlined below. In some embodiments, the materials may be combined to form an insulating packer fluids in accordance with embodiments herein.

The oleaginous fluid may be a liquid, such as a natural or synthetic oil. For example, the oleaginous fluid may include one or more of diesel oil; mineral oil; a synthetic oil, such as hydrogenated and unhydrogenated olefins including poly-alpha olefins, linear and branch olefins and the like, polydiorganosiloxanes, siloxanes, or organosiloxanes, esters of fatty acids, specifically straight chain, branched and cyclical alkyl ethers of fatty acids; similar compounds known to one of skill in the art; and mixtures thereof.

Additives that may be included in the wellbore fluids disclosed herein include, for example, corrosion inhibitors, biocides, pH buffers, mutual solvents, dispersants, thinning agents, rheological additives and cleaning agents. The addition of such agents should be well known to one of ordinary skill in the art of formulating drilling fluids and muds.

Conventional methods can be used to prepare the drilling fluids disclosed herein in a manner analogous to those normally used, to prepare oil-based drilling fluids. In one embodiment, a desired quantity of oleaginous fluid such as a base oil is heated and sheared prior to adding a styrenic thermoplastic block copolymer to the heated and sheared oleaginous fluid. However, heating of the fluid is not required as the polymers will still result in viscosification without such heat. Dispersion of the polymers in the base oil may be aided by the application of heat. Following the addition of the copolymer, the combined oleaginous fluid and styrenic thermoplastic block copolymer. In one or more embodiments, the heating is performed at a temperature below that of the flashpoint of the oleaginous fluid. Further, in one or more embodiments, the shearing of the combined oleaginous fluid and styrenic thermoplastic block copolymer is at a higher shear rate than the shearing of the oleaginous fluid.

In some embodiments, the wellbore fluid may be considered an "all-oil" based wellbore fluid. As used herein, "all-oil" refers to the fluid being essentially free of free water. For example, embodiments herein may include a water-absorbing polymer, such as a polyacrylate, to pull residual, entrained, or produced water out of the fluid, binding the water so as to limit the water's ability to interact with the copolymer, precipitated silicas, weighting agents or other additives, minimizing or negating any effect the water may have on the desired properties of the fluid.

Embodiments of the oil-based insulating packer fluids disclosed herein may include a base oil, such as an oleaginous fluid and a styrenic copolymer, and optionally included silica (such as a precipitated silica) and weighting agents. The combination of these components may provide for desired suspension properties (i.e., no settling over a test period), as well as sufficient viscosity to prevent convection currents when emplaced in a wellbore and held static for a length of time.

Packer fluids may provide an insulative barrier to control heat loss to or from surrounding tubing or casings through both conductive and convective mechanisms. Moreover, packer fluids may be useful in oil or gas well construction operations conducted in extreme temperatures, such as when operating in formations containing permafrost or arctic tundra.

In one or more embodiments, packer fluids of the present disclosure may be emplaced in an annular region created between at least two concentric strings of pipe to insulate, for example, a drill string or production tubing. In some embodiments, once the packer fluid has been emplaced within the annular region it may be held static for a period of time depending on the particular application such as, for example, the duration of the drilling, production, or stimulation operation.

The above-described insulating packer fluids may also be used in heavy oil production, where a high-pressure steam or hot water is injected into the well and the oil reservoir to heat the fluids in the reservoir, causing a thermal expansion of the crude oil, an increase in reservoir pressure and a decrease of the oil's viscosity. For example, packer fluids formulated in accordance with the embodiments disclosed herein may be useful in extreme temperature applications such as wellbore stimulation that requires the injection of $CO_2$ at 400° F. into an oil-producing zone without significantly heating or damaging the surrounding formation. In one or more embodiments, stimulation of a well may be performed by preparing an insulating packer fluid, pumping the packer fluid into an annulus of a wellbore created by at least two concentric strings of pipe extending into the wellbore, and injecting hot water or steam through a pipe extending through the packer fluid.

Packer fluids in accordance with the present disclosure may also be used in annular regions outside of the casing containing the drill string. For example, in packer fluid formulations having a high viscosity such that operating or removing the drill string becomes difficult. However, such formulations may be used in annular regions outside of the casing containing the drill string, providing long term thermal insulation without such complications.

EXAMPLES

Example 1

A fluid was formulated with 5% of DIBLOCK polymer (G1702 from Kraton Polymers), polystyrene-polyethylene/propylene in a ratio of 28/72, in base oil (LVT 200). The polymer is directly added in the base oil and sheared in a lab bench mixer. Rheology was performed on a Fann 35 viscometer at the below temperatures. Tau zero was also measured as shown in Table 1 below.

TABLE 1

|       | RT  | 120 F. | 150 F. | 185 F. | 190 F. |
|-------|-----|--------|--------|--------|--------|
| 600   | 650 | 455    | 455    | 285    | 242    |
| 300   | 480 | 260    | 280    | 175    | 142    |
| 200   | 380 | 200    | 220    | 130    | 105    |
| 100   | 265 | 125    | 145    | 80     | 60     |
| 6     | 80  | 33     | 30     | 5      | 5      |
| 3     | 65  | 30     | 20     | 5      | 3      |
| Tau 0 | 0   | 27.19  | 12.69  | 0      | 0      |

Example 2

A fluid was formulated with 5% of DIBLOCK polymer (EMI 2440 from MI SWACO), polystyrene-polyethylene/propylene in a ratio of 37:63 in base oil (LVT 200). The polymer is directly added in the base oil and sheared in a lab bench mixer. Rheology was performed on a Fann 35 viscometer at the below temperatures. Tau zero was also measured, as shown in Table 2 below.

TABLE 2

|       | RT    | 120 F. | 120 F. | 150 F. | 180 F. |
|-------|-------|--------|--------|--------|--------|
| 600   | 425   | 425    | 335    | 305    | 225    |
| 300   | 325   | 315    | 270    | 225    | 155    |
| 200   | 275   | 265    | 225    | 187    | 123    |
| 100   | 215   | 210    | 158    | 140    | 83     |
| 6     | 100   | 85     | 52.5   | 40     | 40     |
| 3     | 90    | 75     | 50     | 37.5   | 37.5   |
| Tau 0 | 58.50 | 49.40  | 41.37  | 6.04   | 32.40  |

The fluid was then kept at 250 F and measured at various temperatures after periods of time, as shown in Table 3 below.

TABLE 3

|       | 120 F. Fresh | 120 F. 10 days | 120 F. 20 days | 150 F. 10 days | 150 F. 20 days |
|-------|--------------|----------------|----------------|----------------|----------------|
| 600   | 335          | 485            | 480            | 425            | 445            |
| 300   | 270          | 335            | 335            | 300            | 310            |
| 200   | 225          | 275            | 270            | 250            | 255            |
| 100   | 158          | 195            | 195            | 180            | 185            |
| 6     | 52.5         | 52.5           | 55             | 50             | 52.5           |
| 3     | 50           | 40             | 42.5           | 45             | 40             |
| Tau 0 | 41.37        | 15.71          | 16.36          | 17.54          | 17.34          |

Example 3

The thermoplastic elastomer of example 2 was prepared in Escaid 110 base oil at 7 weight percent, and the rheology was tested as shown below in Table 4. The polymer is directly added in the base oil and sheared in a lab bench mixer.

TABLE 4

|       | RT     | 120 F. | 150 F. |
|-------|--------|--------|--------|
| 600   | 910    | 330    | 265    |
| 300   | 693    | 225    | 175    |
| 200   | 610    | 185    | 145    |
| 100   | 490    | 145    | 115    |
| 6     | 243    | 75     | 67.5   |
| 3     | 215    | 70     | 65     |
| Tau 0 | 173.04 | 69.29  | 67.34  |

The fluid was then kept at 250 F and measured at various temperatures after periods of time, as shown in Tables 5 and 6 below.

TABLE 5

|       | RT      |          |          |
|-------|---------|----------|----------|
|       | 1 Month | 2 Months | 3 Months |
| 600   | 670     | 690      | 690      |
| 300   | 445     | 475      | 453      |
| 200   | 355     | 380      | 357      |
| 100   | 247     | 260      | 246      |
| 6     | 65      | 67       | 66       |
| 3     | 50      | 52       | 48       |
| Tau 0 | 28.00   | 15.46    | 29.24    |

TABLE 6

|       | 120 F. |         |          |          |
|-------|--------|---------|----------|----------|
|       | 1 week | 1 Month | 2 Months | 3 Months |
| 600   | 505    | 535     | 505      | 501      |
| 300   | 350    | 365     | 350      | 339      |
| 200   | 287    | 292     | 285      | 270      |
| 100   | 205    | 205     | 200      | 189      |
| 6     | 55     | 55      | 50       | 48       |
| 3     | 40     | 37      | 35       | 36       |
| Tau 0 | 13.97  | 13.97   | 6.30     | 14.48    |

Example 4

The fluid of Example 3 was mixed instead according to the following procedure: 1. Pre-heat oil to 130° F.; 2. Stir oil on Silverson mixer at ~3,800 rpm; 3. Add polymer; 4. Allow mixing, keeping temperature of solution less than 77° C. (flash point of Escaid 110) and at a speed between 3,800 and 4,700 rpm. The fluid was also mixed with 2.5 micron size precipitated silica (10 μm in 250 ml fluid) and the rheology is shown below in Table 7.

TABLE 7

|       | 120 F. Fresh Sample | 150 F. Fresh Sample | 120 F. 2 weeks | 150 F. 2 Weeks |
|-------|---------------------|---------------------|----------------|----------------|
| 600   | 550                 | 522.5               | 555            | 520            |
| 300   | 415                 | 390                 | 380            | 355            |
| 200   | 350                 | 325                 | 315            | 300            |
| 100   | 270                 | 250                 | 220            | 212.5          |
| 6     | 97.5                | 95                  | 65             | 65             |
| 3     | 85                  | 85                  | 47.5           | 52.5           |
| Tau 0 | 29.82               | 42.46               | 25.92          | 34.17          |

Example 6

The fluid of Example 4 (but with 5% polymer) was mixed with 5 wt % coated calcium carbonate. The rheology is shown below in Table 8.

TABLE 8

|  | RT Fresh Sample | 120 F. Fresh Sample | 150 F. Fresh Sample |
|---|---|---|---|
| 600 | 390 | 360 | 300 |
| 300 | 305 | 275 | 220 |
| 200 | 260 | 235 | 187.5 |
| 100 | 205 | 185 | 137.5 |
| 6 | 90 | 82.5 | 50 |
| 3 | 80 | 60 | 45 |
| Tau 0 | 34.28 | 32.64 | 23.67 |

In yet another example, a fluid was formulated with 5% of DIBLOCK polymer in LVT 200. The polymer was directly added in the base oil and sheared in a lab bench mixer. Rheology, as shown in FIG. 1, was performed on a Grace 7500 rheometer at the 250 F. The fluid was aged at 250 F and periodically measured the rheology at 250 F.

While the present disclosure has been described with respect to a limited number of particular means, materials, and/or embodiments, those skilled in the art, having benefit of this disclosure, will appreciate that other embodiments and/or equivalents can be devised which do not depart from the scope of the present disclosure as described herein. Further, it is the express intention of the applicant not to invoke 35 U.S.C. § 112, paragraph 6 for any limitations of any of the claims herein, except for those in which the claim expressly uses the words 'means for' together with an associated function.

The invention claimed is:

1. A method comprising:
   preparing an insulating packer fluid, the preparing comprising:
      adding a styrenic thermoplastic block copolymer to an oleaginous fluid; and
      heating and shearing a combined oleaginous fluid and styrenic thermoplastic block copolymer;
      wherein the shearing of the combined oleaginous fluid and styrenic thermoplastic block copolymer is at a higher shear rate than the shearing of the oleaginous fluid,
   pumping the insulating packer fluid into an annulus extending into a wellbore, and
   and
   holding the insulating packer fluid static in the annulus between a first interior temperature and a second exterior temperature.

2. The method of claim 1, wherein the insulating packer fluid is pumped above a packer installed in the wellbore.

3. The method of 1, further comprising producing hydrocarbons through an interior of two concentric strings of pipe forming the annulus.

4. A method for preparing a packer fluid, the method comprising:
   adding a styrenic thermoplastic block copolymer to an oleaginous fluid; and
   heating and shearing a combined oleaginous fluid and styrenic thermoplastic block copolymer;
   wherein the shearing of the combined oleaginous fluid and styrenic thermoplastic block copolymer is at a higher shear rate than the shearing of the oleaginous fluid.

5. The method of claim 4, wherein the heating is performed at a temperature below that of a flashpoint of the oleaginous fluid.

6. The method of claim 4, wherein the packer fluid further comprises a silica powder present in an amount ranging from 1 to 10 weight percent of the packer fluid.

7. The method of claim 6, wherein the silica powder is a precipitated silica.

8. The method of claim 4, wherein the copolymer is a diblock copolymer.

9. The method of claim 8, wherein comonomers of the styrenic thermoplastic block copolymer include styrene and at least one selected from a group of: ethylene, propylene, butylene, and mixtures thereof.

10. The method of claim 4, wherein the copolymer is a triblock copolymer.

11. The method of claim 4, wherein a weight percent of polystyrene in the thermoplastic block copolymer is at least 20%.

12. The method of claim 4, wherein a weight percent of polystyrene in the thermoplastic block copolymer is at least 25%.

13. The method of claim 4, wherein a weight percent of polystyrene in the thermoplastic block copolymer is about at least 40%.

14. The method of claim 4, wherein a weight percent of the thermoplastic block copolymer in the fluid is in a range of about 0.5% to 10%.

15. The method of claim 4, wherein a weight percent of the thermoplastic block copolymer in the fluid is in a range of about 4% to 8%.

16. The method of claim 4, wherein the oleaginous fluid comprises at least one selected from diesel oil, paraffin oil, mineral oil, isomerized olefins, and mixtures thereof.

17. The method of claim 4, further comprising at least one particulate agent.

18. The method of claim 17, wherein the particulate agent comprises a weighting agent.

19. The method of claim 4, the packer fluid further comprising one or more of an alkyl diamide or an oil-soluble polymer.

20. A method for stimulating a well, the method comprising preparing a packer fluid comprising:
   adding a styrenic thermoplastic block copolymer to an oleaginous fluid; and
   heating and shearing a combined oleaginous fluid and styrenic thermoplastic block copolymer;
   wherein the shearing of the combined oleaginous fluid and styrenic thermoplastic block copolymer is at a higher shear rate than the shearing of the oleaginous fluid,
   and
   pumping the packer fluid into an annular region of a wellbore created by two concentric strings of pipe extending into the wellbore; and
   injecting hot water or steam through a pipe extending through the annular region containing the packer fluid.

21. The method of claim 20, further comprising holding the packer fluid static in the annular region.

* * * * *